May 10, 1927.
N. P. LARSEN
VEHICLE
Filed Feb. 2, 1926
1,627,911
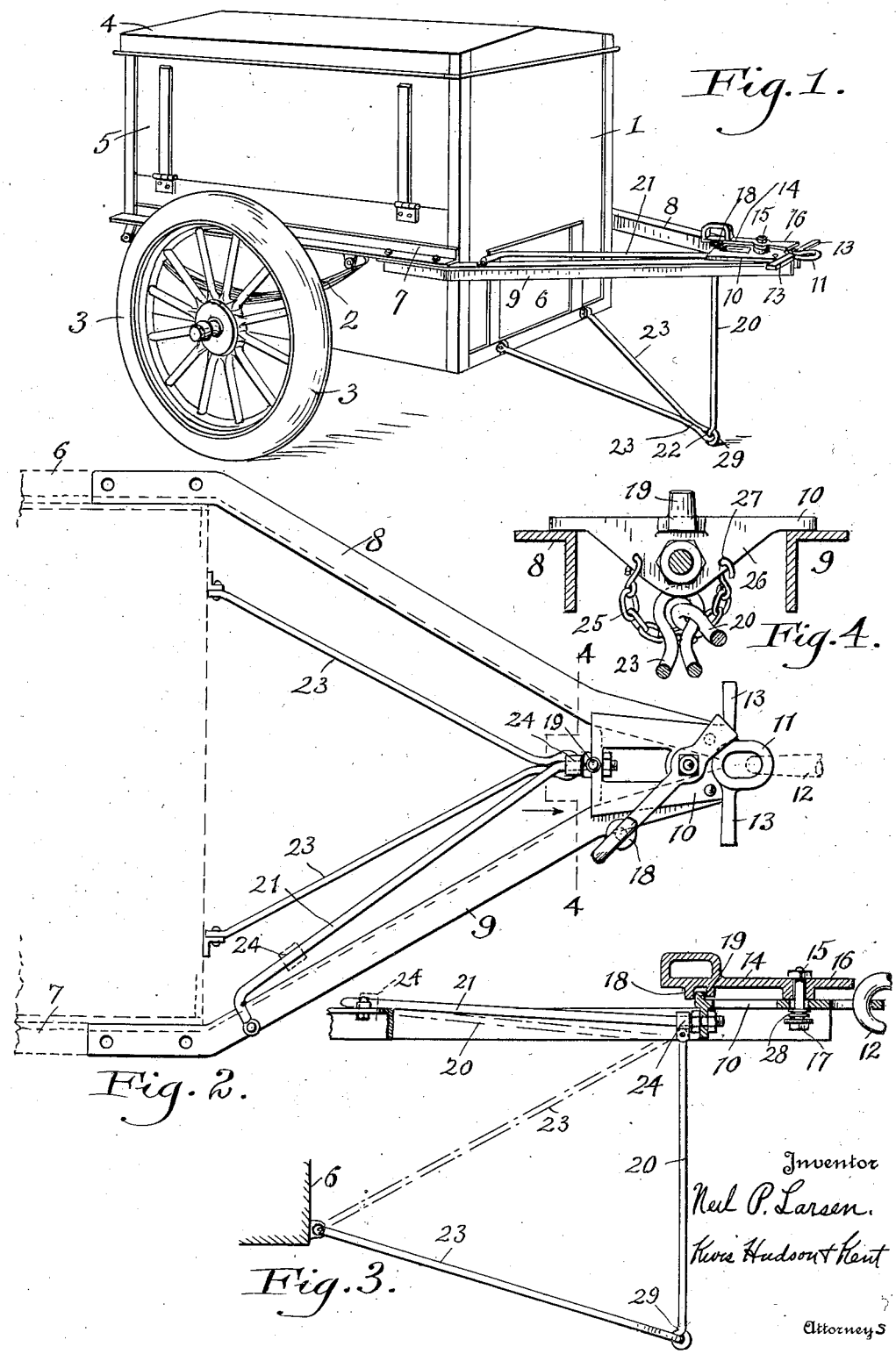

Patented May 10, 1927.

1,627,911

UNITED STATES PATENT OFFICE.

NIEL P. LARSEN, OF CLEVELAND, OHIO, ASSIGNOR TO THE AMERICAN COACH & BODY COMPANY, OF CLEVELAND, OHIO, A CORPORATION OF OHIO.

VEHICLE.

Application filed February 2, 1926. Serial No. 85,482.

This invention relates to vehicles, and more particularly to the type of vehicle commonly known as a trailer, and has for its object to provide means for attaching the trailer to the dray vehicle in a simple but positive manner.

A further object of the invention is to provide a means for supporting the forward end of the trailer when the trailer is disconnected from the dray vehicle.

A still further object is to provide a detachable means between the trailer body and the nose portion, which detachability facilitates in the shipment of the trailer.

With the objects above indicated and other objects hereinafter explained, in view, my invention consists in the construction and combination of elements hereinafter described and claimed.

Fig. 1 is a perspective view of the trailer vehicle showing the device embodying the invention and the means for securing the device to the body of the trailer; Fig. 2 is a top plan view of the invention showing the relative positions of the various members and the locking means; Fig. 3 is a segmentary sectional view showing the supporting means in open position; and Fig. 4 is a cross-sectional view on the line 4—4 of Fig. 2, showing the means for retaining the supporting means in folded position.

In the drawings, 1 indicates generally the body portion of a trailer vehicle having the usual spring supporting means 2, to which are secured the wheels 3. The body portion 1 may have doors 4, 5 and 6 placed in the most desirable positions. On each side of the body member 1 there is secured an angle member 6 and 7 respectively, extending the entire length of the body member 1. Secured to the forward end of the body member 1 and extending forwardly thereof are converging angle members 8 and 9 having their wider spaced ends secured to the angle members 6 and 7 of the body portion by means of bolts. The making of this member detachable from the body portion of the trailer permits the trailer to be shipped with the converging members detached therefrom so as to consume less space.

At the forward end of the angles 8 and 9 is secured a plate 10, to the upper surface thereof, said plate being provided with a slotted portion 11 to accommodate the hook 12 of the dray vehicle. The plate 10 is further provided with handles 13 extending transversely, which are provided as means for pulling the trailer by hand. On the upper surface of the plate 10 there is provided a rotatable locking member 14, secured to the plate 10 by means of a bolt 17. The locking member 14 has a forwardly extending portion 16, adapted to engage the hook 12 of the dray vehicle when the locking member is in closed position. Between the under portion of the plate 10 and the nut 17, there is introduced a spring 28 which enables the locking member 14 to be slightly rocked to permit the walls of the recessed boss 18 on the lower rear portion of the locking member 14 to slide over the lug 19 on the upper surface of the plate 10. This provides a means for locking the locking member 14 in positive engagement with the hook 12 of the dray vehicle.

In order to support the forward end of the trailer vehicle when it is detached from the dray vehicle, a depending leg 20 is slidably secured at one end to a rod 21. One end of the rod 21 is securely fastened to the angle 9 and extends forwardly at a slight angle therewith, the forward end being slightly bent along the center line of the vehicle, and permitted to extend into an opening provided in the depending rear portion 26 of the plate 10. The end of the rod is threaded and held in place by nuts. The lower end of the rod 20 is looped to form an opening 29, adapted to receive the looped end 22 of the V-shaped rod member 23, which is pivotally secured to the body member 1.

When it is desired to fold this supporting member or leg 20 into folded position, for instance when it is to be attached to the dray vehicle, the upper slidable end member 24 is permitted to slide along the rod 21 for the entire length thereof, which sliding permits the lower end of the leg 20 to be drawn upwardly, the rod 20 extending substantially parallel to the rod 21, as shown in dotted lines on Fig. 3.

As a means for securing the leg or supporting member 20 in folded position, a chain 25 is secured at one end to a depending portion 26 at the rear of the plate 10. This chain is passed around and beneath the supporting member 23, and has its opposite end provided with a hook 27, which is adapted to engage with an opening in the plate 10 diametrically opposite from the hole in the plate accommodating the other end of the chain.

When it is desired to secure the trailer body to the end of the dray vehicle, it is necessary to insert the hook 12 of the dray vehicle into the slotted portion 11 of the trailer vehicle. In order to lock this hook into engaging position, the member 14 is pivoted about the bolt 17, and the recessed boss 18 is adapted to engage the upwardly extending lug 19 on the plate 10. This rocking movement of the member 14 is permitted by means of the spring 28 which is provided between the under side of the plate 10, and the bolt 17. This assures a positive connection between the dray vehicle and the trailer vehicle, and prevents any chance of the two becoming separated or accidentally disengaged.

When the trailer vehicle is disengaged from the dray vehicle, for instance when it has arrived at the particular job wherein it is needed, it is disconnected from the dray vehicle by rotating the locking member 14 and disengaging the hook 12 from the slotted hole 11. When it has been thus disengaged, the supporting means 20 at the forward end of the trailer is brought into operation, and this is accomplished by unhooking the chain 25 from the depending portion 26 of the plate 10, and permitting the end 29 of the rod 20 to drop to the ground into a vertical position. In order that the depending leg 20 may be maintained in a vertical position, the upper end 24 is permitted to slide along the rod 21 until it engages with the forwardly extending portion of the rod 21, and it is thereby held in place.

The means for attaching the converging tongue member to the trailer is so arranged as to permit said member to be readily used and attached to the various types of trailers now in use and on the market, it being only necessary to drill proper holes in the body of the trailer to accommodate the openings in the angle members 8 and 9 when it is to be attached to the body member 1.

Having described my invention, I claim:

1. A vehicle of the type described, comprising a body portion and wheels attached thereto, a tongue comprising forwardly converging side members connected to the body portion, means for supporting said members comprising a rod attached at one end to one of the converging members and extending substantially parallel therewith, a leg slidably connected to said rod, and means for securing said leg in operable position.

2. A vehicle of the type described, comprising a body portion and wheels attached thereto, a tongue comprising forwardly extending converging side members connected to the body portion, means for supporting said members comprising a rod attached at one end to one of the converging members and extending substantially parallel therewith, a leg slidably connected to said rod, and means connected to the body portion and the leg for securing the latter in operable position.

3. A vehicle of the type described, comprising a body portion and wheels attached thereto, a tongue comprising forwardly extending converging side members connected to the body portion, and means for supporting said members comprising a rod attached at one end to one of the converging members and extending at a slight angle thereto and having its other end bent forwardly to engage the forward portion of the converging members, a leg slidably connected to said rod, the slidable member adapted to engage the forwardly bent end of the rod, and means pivotally connected to the body portion and the leg for securing the latter in operable position.

4. A vehicle of the type described, comprising a body portion and wheels attached thereto, a tongue comprising converging members connected to the body portion, a horizontal plate secured to the forward end thereof and provided with an opening therein adapted to receive the connection of a dray vehicle, a horizontally rotatable member having a loose pivotal connection with the plate adapted to engage the dray connection and prevent disengagement thereof with said opening, said plate and rotatable member having a cooperating projection and socket, and a spring at said pivotal connection for releasably holding said projection and socket in engagement.

5. In a vehicle of the class described, a body, a pair of wheels upon which the body is pivotally mounted, and means for supporting the body in a horizontal position when the vehicle is at rest comprising a guide fixed to the body in a horizontal plane, a leg having its upper end mounted to slide upon said guide, and a brace pivoted to the lower end of said leg and to the body below the plane of said guide whereby the leg and brace may be folded up to provide road clearance when the vehicle is in motion.

In testimony whereof, I hereunto affix my signature.

NIEL P. LARSEN.